United States Patent [19]

Shank

[11] 3,846,044
[45] Nov. 5, 1974

[54] TURBOMACHINE ASSEMBLY

[75] Inventor: Wayne C. Shank, Tucson, Ark.

[73] Assignee: Avco Corporation, Williamsport, Pa.

[22] Filed: Sept. 14, 1973

[21] Appl. No.: 397,319

[52] U.S. Cl. ............................... 416/199, 416/244
[51] Int. Cl. ............................................. F01d 5/06
[58] Field of Search ........................ 416/199, 244 A

[56] References Cited
UNITED STATES PATENTS

| | | | |
|---|---|---|---|
| 2,619,317 | 11/1952 | Traupel | 416/244 A X |
| 2,795,371 | 6/1957 | Buchi et al. | 416/244 A X |
| 2,843,311 | 7/1958 | Buchi | 416/244 A X |
| 2,912,155 | 11/1959 | Buchi | 416/244 A X |
| 3,051,437 | 8/1962 | Morley et al. | 416/244 A X |
| 3,356,339 | 12/1967 | Thomas et al. | 416/244 A X |
| 3,589,149 | 6/1971 | Fischer | 416/241 A UX |
| 3,749,516 | 7/1973 | Samurin et al. | 416/199 |

Primary Examiner—Everette A. Powell, Jr.
Attorney, Agent, or Firm—Charles M. Hogan; Irwin P. Garfinkle

[57] ABSTRACT

A centrifugal impeller and centripetal turbine, both operable at extremely high rmp's, are connected through a pilot joint comprising an outer sleeve extending from one of the joint components and telescoped over an inner sleeve extending from the other component. A flange section extends radially inward from the inner sleeve adjacent to a pilot interface between the sleeves with a fit permitting ease of assembly and disassembly. The flange is interrupted at a number of positions to provide sufficient flexibility in the periphery of the inner pilot surface to cause it to expand radially outward in response to centrifugal force on the flange and thus maintain concentricity of the compressor relative to the turbine and increase the press fit for torque transmissability.

5 Claims, 7 Drawing Figures

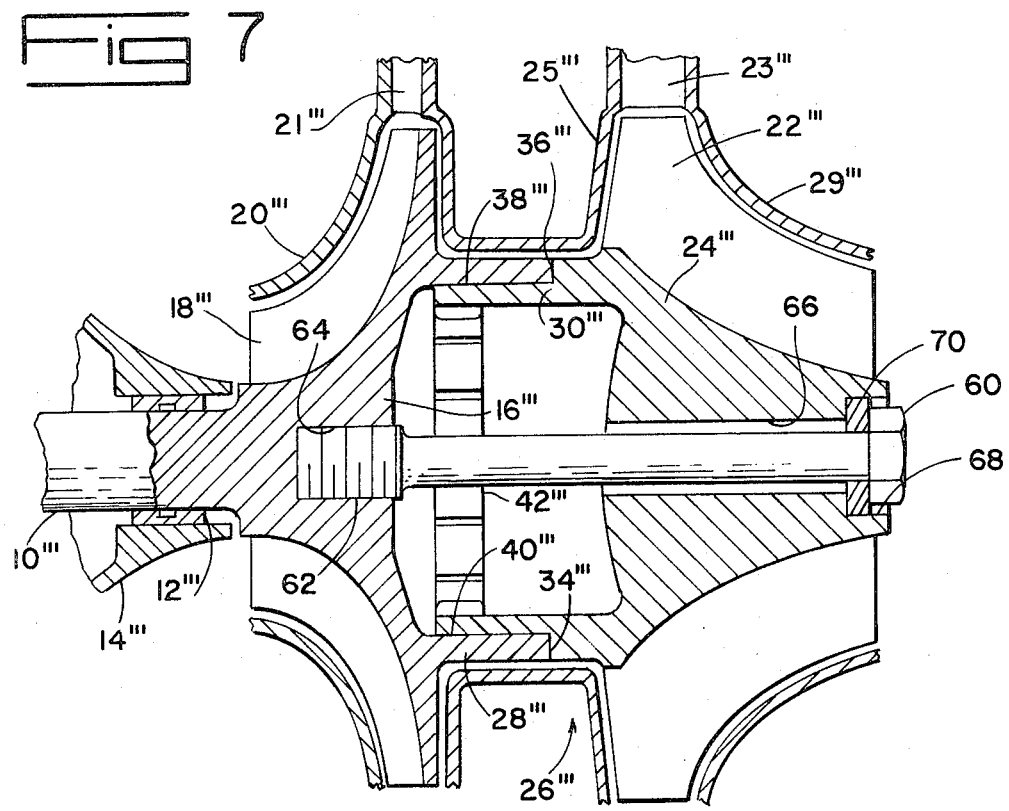

TURBOMACHINE ASSEMBLY

The present invention relates to rotating turbomachine components and more particularly to means for connecting a pair of these components.

Recent development work on high rpm, small gas turbine engines has exposed a number of potential problems. One of the particularly acute problems is the difficulty of maintaining a pair of rotating turbomachine components, such as a compressor and turbine, concentric relative to one another. It is essential that these components are maintained concentric with respect to one another for the extremely high rates of rotation that sometimes exceed 60,000 rpm.

It has been the practice in the past to maintain these components concentric or to "pilot" them relative to one another by having inner and outer telescoping sleeves respectively connected to the two components. The sleeves may be threaded relative to one another to hold the components together axially or may be connected with a center tie bolt. A pilot section consisting of precisely machined surfaces on the inner diameter of the outer sleeve and the outer diameter of the inner sleeve function as pilot surfaces to maintain this concentricity.

In order to permit assembly of the two sleeves, a small clearance or light press is generally provided between the pilot surfaces, e.g., several ten thousandths of an inch. This clearance for assembly purposes is insufficient to maintain concentricity, balance and allow torque transmission at high rmp's. A compressor and turbine generally have shrouds in which they rotate and the clearances must be maintained as small as possible to provide efficient operation. The loose connection at the pilot joint increases the possibility that the compressor or turbine would rotate off center and rub against their shroud.

This problem is solved by a pilot joint connecting a pair of rotating turbomachine components. The pilot joint comprises an outer sleeve connected to one of the components and an inner sleeve connected to the other of the components and telescoped into the outer sleeve. Concentric pilot surfaces are provided on the inner and outer sleeves with a clearance permitting assembly and disassembly. An inwardly directed flange is positioned on the inner sleeve radially inward of the pilot surface. The flange has a series of radial notches around its periphery to make the outer periphery of the inner sleeve sufficiently flexible to expand outward in response to centrifugal force and maintain the pilot between the turbomachine components at high rpm's.

The above and other related features of the present invention will be apparent from a reading of the following description of the disclosure shown in the accompanying drawings and the novelty thereof pointed out in the appended claims.

In the drawings:

FIG. 7 is a fragmentary longitudinal section view of a gas turbine engine incorporating another embodiment of the present invention.

Figure 1:
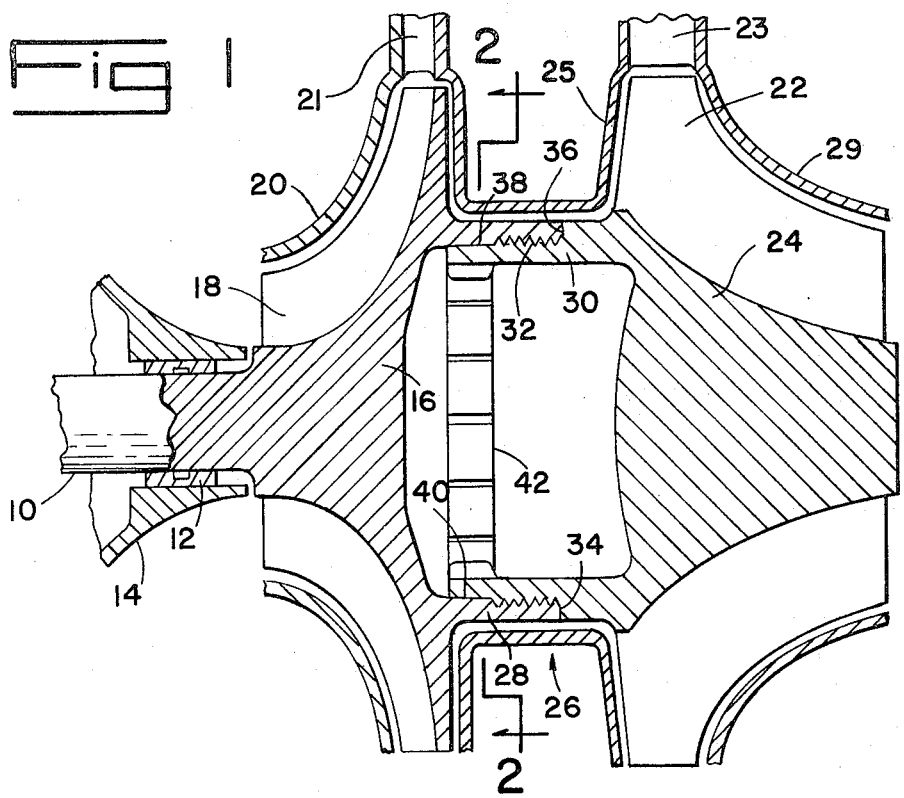
FIG. 1 is a longitudinal section view of a pair of rotatable turbomachine components connected by a pilot joint embodying the present invention.

FIG. 1 shows a pair of rotatable components of a gas turbine engine along with a brief showing of associated elements of the engine. Many elements usually found in a gas turbine engine have been omitted to simplify and focus on the subject of the present invention. It will be understood, of course, that those skilled in the art would employ the usual elements necessary to make the engine a complete and operable engine.

FIG. 1 shows an output shaft 10 journaled by a bearing assembly 12 that is supported by an annular bellmouth housing 14. Housing 14 generally houses a gear box or other speed-reduction device, since the shaft 10 rotates at speeds sometimes exceeding 50,000 rpm. A centrifugal compressor hub 16 is integral with the output shaft 10 and has a series of compressor blades 18. An annular shroud 20 (shown in fragmentary form) surrounds the compressor and forms the outer bounds of a flow path across the compressor blades 18. Air is pressurized and centrifuged by the compressor and discharged through a diffuser 21 where its static pressure is increased. From there the air passes to a combustor (not shown) in which the pressurized air is mixed with metered fuel and ignited to generate a hot gas stream. The hot gas stream passes through a turbine inlet duct (not shown), through an annular turbine nozzle 23 and finally across turbine blades 22 secured to a centripetal turbine hub 24. Annular shroud elements 25 and 29 surround the turbine blades 22 and define a flow path for the hot gas stream.

The compressor hub 16 and the turbine hub 24 are connected at a pilot joint. This joint comprises an outer, axially extending sleeve 28 integral with the compressor hub 16. An inner, axially extending sleeve 30 is integral with the turbine hub 24 and telescopes into the outer sleeve 28. Threaded connections 32 on the inner and outer sleeves 30, 28 enable the sleeves to be threaded into one another and maintained in that position. An end face 34 on outer sleeve 28 and a shoulder 36 on inner sleeve 30 position the turbine and compressor hubs 16 and 24 axially with respect to one another.

A cylindrical pilot surface 38 on the inner sleeve intimately contacts a cylindrical pilot surface 40 on the outer sleeve. A clearance of several thousandths of an inch is maintained between the pilot surfaces to permit assembly of the rotating turbomachine components.

Flange section 42 is integral with the inner sleeve 30 and extends radially inward in radial alignment with the pilot surfaces 38 and 40. As explained later, the flange section 42 extends radially inward a sufficient amount to achieve a predetermined mass. A series of radial notches 44 are provided in the flange section 42 and have sufficient depth to provide a predetermined flexibility for pilot surface 38 on the inner sleeve 30.

Figure 2:
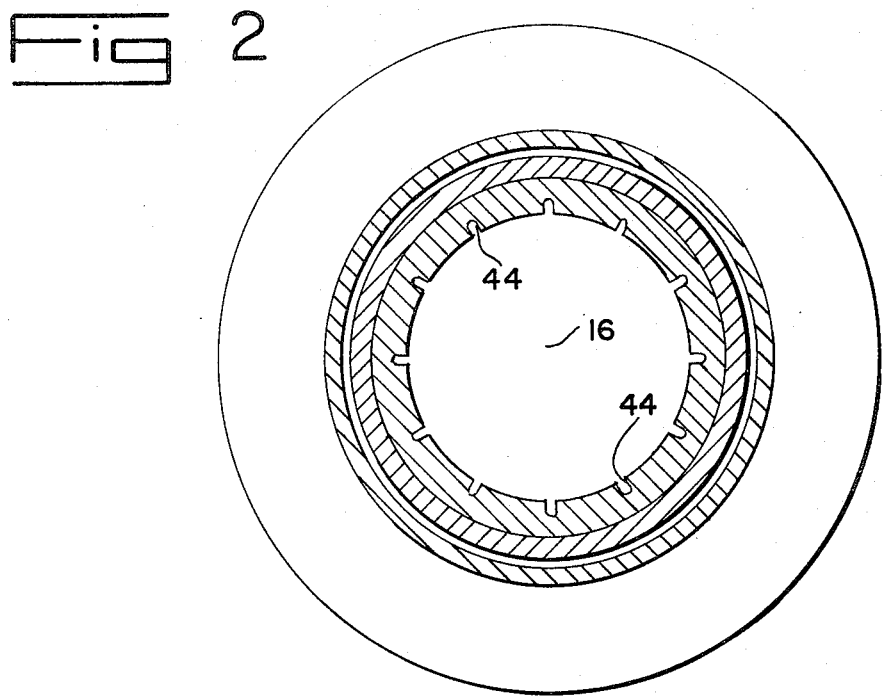
FIG. 2 is a cross-sectional view of the pilot joint of FIG. 1, taken on line 2—2 of FIG. 1.
Figure 3:
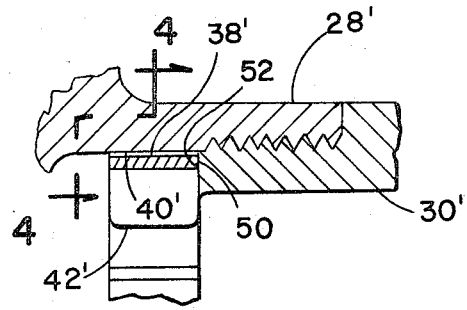
FIG. 3 is an enlarged fragmentary longitudinal section view of a pilot joint incorporating an alternate embodiment of the present invention.
Figure 4:
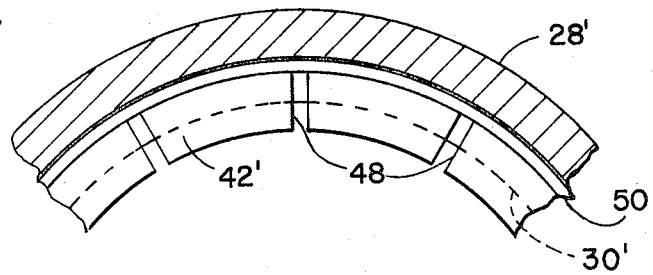
FIG. 4 is a fragmentary cross-sectional view of the pilot joint of FIG. 3, taken on line 4—4 of FIG. 3.

FIGS. 3 and 4 show an alternate arrangement for the pilot joint of FIGS. 1 and 2. The inner sleeve 30' has a flange 42' with a series of radial notches 48 extending from its inner to its outer periphery. A relatively thin continuous ring 50 is received over the outer periphery of the flange 42' and abuts a shoulder 52 in the inner sleeve 20 to form a smooth pilot surface 38' for sleeve 30'. A clearance or fit suitable for assembly purposes is maintained between pilot surface 38'' on the periphery of ring 50 and the pilot surface 40' on the outer sleeve 28'.

Figure 5:
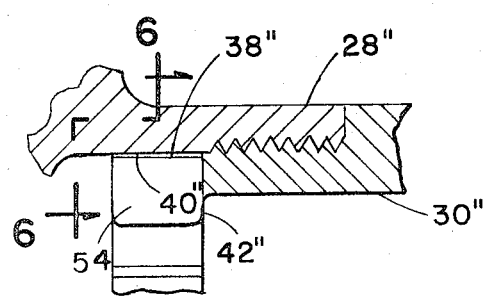
FIG. 5 is an enlarged fragmentary longitudinal section view of a pilot joint employing still another embodiment of the present invention.
Figure 6:
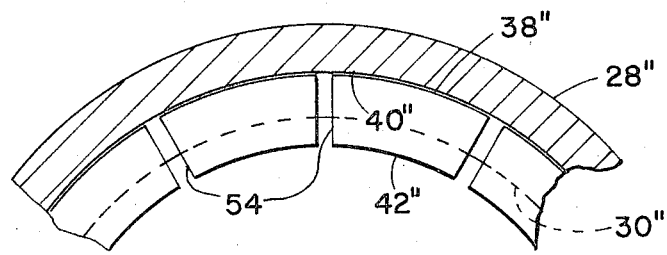
FIG. 6 is a fragmentary cross-sectional view of the pilot joint of FIG. 5, taken on line 6—6 of FIG. 5.

Referring to FIGS. 5 and 6 there is shown still another pilot joint in which the inner sleeve 30'' has a flange 42'' with a series of notches 54 extending from its inner diameter to the outer pilot surface 38''. As seen in FIG. 6 particularly, this provides an interrupted peripheral pilot surface 38'' for sleeve 20''. As stated above, there is a suitable fit between the pilot surfaces 38'' and 40'' to permit assembly of the inner and outer sleeves 30'' and 28'', respectively.

FIG. 7 shows another pilot joint in which the threaded sections between the telescoping shafts 28''' and 30''' are eliminated. The resultant cylindrical surfaces form extensions of surfaces 38''' and 40'''. The shafts and hubs are held axially by a tie bolt 60. Bolt 60 has a head and a washer 70 both received in recess 68 in the turbine hub. Bolt 60 extends through hole 66 in turbine hub 24''' and has a threaded end 62 received in a threaded bore 64. The bolt 60 holds the shafts 28''', 30''' so that the end 34''' of shaft 28''' abuts shoulder 36''' of shaft 30'''.

All of the pilot joints described above are assembled by simply inserting the inner into the outer sleeve and either threading them or tightening the tie bolt so that the surfaces 34 and 36 abut. 3

When the turbomachine assembly is rotated at high rpm the flange section 42, shown in each of the embodiments, has sufficient mass so that it is urged outward by a significant centrifugal force; for example, if the mean radius of the flange section were three inches the weight of the flange section 42 would be increased over 200,000 times for an rpm of approximately 50,000. The axial and radial dimensions of flange 42 and density are selected to achieve a predetermined radial force for the expected rpm of the rotating components.

The provision of the notches 42 for the embodiment of FIG. 1 takes away very little of the mass in the flange but at the same time produces sufficient flexibility in the periphery of the inner sleeve to permit it to expand outward in response to the centrifugal force acting on the flange section. This causes the inner pilot surface 38 to expand into extremely tight engagement with the outer pilot surface 40 at high rpm's. The maintenance of a coaxial relationship at these speeds is particularly critical and this flange causes the effectiveness of the pilot connection to be increased with increasing rpm.

The extent to which the flange 42 is notched may be determined by a number of factors, including the strength of the material. The stronger the material of the flange and the sleeve, the deeper the notches may extend. The notches may extend to the periphery of the flange 42 and have a sleeve of relatively thin material over it, as shown in FIGS. 3 and 4, to provide a high degree of flexibility in the outer pilot surface 38'.

The pilot joints shown in FIGS. 1 and 2 are particularly effective where the joint also acts as a seal between different zones in a gas turbine engine. If the requirement of a sealing surface is not present the notches may extend entirely through the flange and inner sleeve, as shown in FIGS. 5 and 6, to form an interrupted pilot surface 38''. This provides a maximum degree of flexibility in the pilot surface and insures a maximum expansion of the pilot surface in response to centrifugal force.

While several preferred embodiments of the present invention have been described, it should be apparent to those skilled in the art that the invention may be practiced in other forms without departing from its spirit and scope.

Having thus described the invention, what is claimed as novel and desired to be secured by Letters Patent of the United States is:

1. A turbomachine rotor assembly comprising:
   first and second bladed rotor elements;
   an outer sleeve coaxial with and extending from one of said rotor elements;
   an inner sleeve coaxial with the other of said rotor elements and received in said outer sleeve, said inner and outer sleeves having concentric pilot surfaces for maintaining the sleeves coaxial with respect to one another, a suitable fit being maintained between said pilot surfaces to permit ease of assembly and disassembly of said sleeves;
   means for axially securing said sleeves relative to one another; and
   an integral flange at the end of said inner sleeve, said flange extending from the inner periphery of said sleeve, said flange having a plurality of radial notches extending from the inner diameter of said flange to provide flexibility in the pilot surface of said inner sleeve, thereby permitting it to expand radially outward in response to centrifugal force acting on the flange for maintaining the inner and outer sleeves coaxial.

2. Apparatus as in claim 1 wherein the means for holding said sleeves axially comprises cooperating threaded sections on said inner and outer sleeves, said outer sleeve having a shoulder adjacent the threaded section thereof for abutting the end of said outer element for abutting the end of said outer sleeve.

3. Apparatus as in claim 1 wherein:
   said notches extend from the inner periphery of said inner sleeve to the inner periphery of said flange; and
   said apparatus further comprises a relatively thin wall ring telescoped over the outer surface of said flange thereby forming the pilot surface for said inner sleeve.

4. Apparatus as in claim 1 wherein said notches extend from the inner surface of said flange to the outer surface of said sleeve forming an interrupted pilot surface for said inner sleeve.

5. Apparatus as in claim 1 wherein the means for holding said sleeves comprises a tie bolt axially securing said bladed rotor elements.

* * * * *

PO-1050
(5/69)

UNITED STATES PATENT OFFICE
CERTIFICATE OF CORRECTION

Patent No. 3,846,044        Dated November 5, 1974

Inventor(s) WAYNE C. SHANK

It is certified that error appears in the above-identified patent and that said Letters Patent are hereby corrected as shown below:

On the Abstract page, Col. 1, "Wayne C. Shank, Tucson, Ark."

should read -- Wayne C. Shank, Tucson, Arizona -- .

Col. 3, line 31, "abut. 3" should read -- abut. -- .

Signed and sealed this 7th day of January 1975.

(SEAL)
Attest:

McCOY M. GIBSON JR.          C. MARSHALL DANN
Attesting Officer            Commissioner of Patents